(12) United States Patent
Berghegger

(10) Patent No.: US 7,092,260 B2  
(45) Date of Patent: Aug. 15, 2006

(54) SHORT-CIRCUITING RECTIFIER FOR A SWITCHED-MODE POWER SUPPLY

(75) Inventor: Ralf Schröder genannt Berghegger, Glandorf (DE)

(73) Assignee: FRIWO Mobile Power GmbH, Ostbevern (DE)

( * ) Notice: Subject to any disclaimer, the term of this patent is extended or adjusted under 35 U.S.C. 154(b) by 106 days.

(21) Appl. No.: 10/924,686

(22) Filed: Aug. 24, 2004

(65) Prior Publication Data

US 2005/0047184 A1    Mar. 3, 2005

(30) Foreign Application Priority Data

Aug. 27, 2003  (DE) ................ 103 39 470

(51) Int. Cl.  
*H02M 3/335* (2006.01)  
*H02H 7/125* (2006.01)

(52) U.S. Cl. ............... 363/21.06; 363/21.14; 363/53; 363/89

(58) Field of Classification Search ........... 363/21.06, 363/21.14, 53, 89  
See application file for complete search history.

(56) References Cited

U.S. PATENT DOCUMENTS 5,708,571 A    1/1998   Shinada 6,961,256 B1 *  11/2005  Yang ..................... 363/127

FOREIGN PATENT DOCUMENTS

| DE | 100 18 229 A1 | 10/2001 |
|----|---------------|---------|
| TW | 519789 | * 2/2003 |
| WO | WO 99/57799 | 11/1999 |

* cited by examiner

*Primary Examiner*—Shawn Riley  
(74) *Attorney, Agent, or Firm*—Michael Best & Friedrich LLP

(57) ABSTRACT

A control circuit for controlling the output voltage of a primary-controlled switched mode power supply. The switched mode power supply includes a primary-side switch and a transformer with a primary winding, a secondary winding and a secondary-side auxiliary winding. The control circuit is connected to the auxiliary winding and a voltage tapping point between the secondary winding and the auxiliary winding. The control circuit includes a secondary-side switch and an RC element. The secondary-side switch short-circuits the connection between the output terminal and the voltage tapping point and the RC element provides positive and negative control pulses having a predefined time constant.

12 Claims, 3 Drawing Sheets

SHORT-CIRCUITING RECTIFIER FOR A SWITCHED-MODE POWER SUPPLY

BACKGROUND OF THE INVENTION

1. Field of the Invention

The present invention relates to switched mode power supplies, and, in particular, to a control circuit for controlling a switch which temporarily short-circuits the secondary diode of a switched mode power supply and reduces the power loss in this way. The invention especially relates to a control circuit in a primary-controlled switched mode power supply, which comprises a primary-side switch and a transformer with a primary winding, a secondary winding and a secondary-side auxiliary winding. A voltage tapping point is provided between the secondary winding and the auxiliary winding, the control circuit being adapted to be connected to a connection of the auxiliary winding and to said voltage tapping point. The control circuit is adapted to be connected to an output terminal of the switched mode power supply and the output voltage is adapted to be tapped parallel to the secondary winding. The invention additionally relates to a switched mode power supply for generating an output voltage, said switched mode power supply making use of the control circuit.

2. Description of the Related Art

Switched mode power supplies are clocked power supply units which chop a rectified, filtered mains voltage. Such switched mode power supplies are nowadays preferred to conventional power packs with power transformers for many cases of use, since, from a certain performance category onwards, they have a better efficiency and require in particular less space.

The use of electronic switches causes, essentially, only switching losses, the voltage transformed being, instead of the mains voltage, a high-frequency a.c. voltage. Instead of the normal mains frequency of 50 Hz or 60 Hz, the high-frequency a.c. voltage can e.g. be in the range of from 20 kHz to 200 kHz.

Since the necessary numbers of windings of the transformer decrease inversely proportional to the frequency, the ohmic losses can be markedly reduced in this way and the transformer required becomes much smaller. Control is effected either by varying the pulse duty ratio at a constant frequency or by varying the frequency at a fixed or variable pulse duty ratio.

The output voltage can be determined by the clock ratio with which the electronic switch is closed. The voltage chopped by the electronic switch can be transformed into any other voltage and rectified. When, for controlling a desired d.c. output voltage of a switched mode power supply, the pulse duty ratio of a switch is varied on the primary side, the switched mode power supplies in question are referred to as primary-clocked switched mode power supplies. Primary-clocked switched mode power supplies are normally preferred because of their higher efficiency.

In order to optimize the efficiency still further, especially primary-clocked switched mode power supplies are known in the case of which the frequency generated by the switch, e.g. a bipolar transistor, on the primary side of the high-frequency transformer is controlled in dependence upon the load applied to the secondary side of the power pack, so as to avoid saturation of the high-frequency transformer. The feedback required for this kind of control is realized e.g. in that a voltage tapped at an auxiliary winding is used as a reference value.

Generating a reference value by making use of an auxiliary winding is shown e.g. in German patent application DE 100 18 229 A1. The method described in DE 100 18 229 A1 and used for controlling the output current and/or the output voltage of a primary-controlled switched mode power supply comprises the use of a reference value so to as to make the current and voltage control independent of the input voltage, said reference value being formed within the circuit and used for influencing the voltage controller.

Switched mode power supplies of this kind often operate a secondary circuit comprising a plurality of diodes, capacitors and other electronic components. For converting the a.c. voltage generated by the switched mode power supply into a d.c. voltage, diodes are used. Since these diodes cause a non-negligible voltage drop during the current flow, an undesirable power loss will be caused. In order to reduce this power loss, a switch, e.g. a field effect transistor, is switched on parallel to the diode, if necessary. This has the effect that the voltage drop decreases and that the power loss will be reduced.

Such a circuit is referred to as synchronous rectifier. Such synchronous rectifiers require in some cases a considerable investment in circuit technology for controlling the switch; it is desirable to reduce this investment in circuit technology so as to be able to offer the switched mode power supply in a more compact structural design which can be produced at a more reasonable price.

Moreover, from WO99/5777 a continuous mode flyback converter is known, wherein an FET transistor is provided for reducing the voltage drop at the secondary side of the transformer. The use of the FET transistor makes the converter more suitable for low voltage applications since smaller power losses are imposed in the secondary side of the converter than in a conventional converter. The converter also has a DC-blocking capacitor for further reducing the power losses at the secondary side. The secondary side further comprises a PNP transistor, the emitter of which is connected to the gate of the FET transistor, the collector of which is connected to the source of the FET transistor, and the base of which is connected to the first terminal of the auxiliary winding.

This circuit, however, suffers from the problem that by providing said PNP transistor the circuitry is still too complicated and expensive, and that the reliability may still further be improved.

SUMMARY OF THE INVENTION

It is therefore the object of the present invention to design a control circuit and a respective method for controlling the switch in a synchronous rectifier in such a way that it can be realized with a minimum investment in circuit technology.

The present invention is based on the finding that a simple RC element can be used for controlling a secondary-side switch in a synchronous rectifier and that the investment in circuit technology on the secondary side can simultaneously be markedly reduced. According to the present invention, a control circuit for controlling a synchronous rectifier is provided, in the case of which the switched mode power supply comprises a primary-side switch and a transformer with a primary winding, a secondary winding and a secondary-side auxiliary winding. A voltage tapping point is provided between the secondary winding and the auxiliary winding. The control circuit is adapted to be connected to a connection of the auxiliary winding and to said voltage tapping point, said control circuit being connectable to an output terminal of the switched mode power supply and the output voltage being adapted to be tapped parallel to the secondary winding. The control circuit comprises a secondary-side switch for short-circuiting a rectifier diode between the output terminal and the voltage tapping point. The control circuit additionally comprises an RC element for providing positive and negative control pulses having a predefined time constant, said RC element being connected in parallel to the auxiliary winding. The advantage obtained here is that a voltage drop across the rectifier diode will not find expression in the output voltage of the switched mode power supply. During a flow of current through the rectifier diode, the voltage dropping across said rectifier diode is reduced by temporarily short-circuiting said diode, whereby the power loss will be reduced. In addition, it is of advantage that an essentially reduced number of standard electronic components can be used for controlling the switch.

According to a further embodiment, the secondary-side switch is a field effect transistor, the control circuit including a resistor for defining a switching voltage of the field effect transistor. The resistor is connected to the voltage tapping point and to a control input of the field effect transistor. This embodiment is advantageous insofar as the use of a field effect transistor allows an exact control of the output voltage of the switched mode power supply. In addition, it is of advantage that the field effect transistor is a commercially available and inexpensive component, which permits the control circuit to be produced at a reasonable price. Such a field effect transistor can be controlled almost at zero power, whereby the demand for saving energy will be satisfied.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention is illustrated in the accompanying drawings, wherein.

DETAILED DESCRIPTION OF THE INVENTION

The illustrated embodiments of the present invention will be described with reference to the figure drawings wherein like elements and structures are indicated by like reference numbers.

Figure 1:
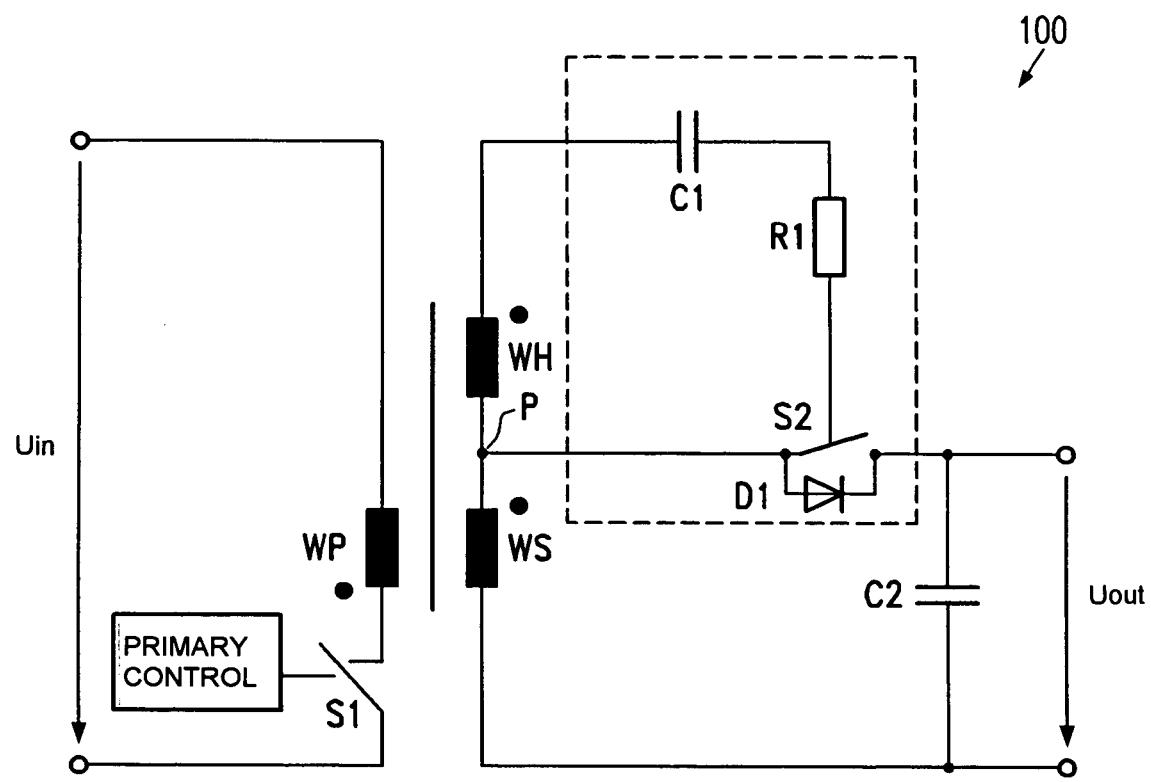
FIG. 1 shows a schematic circuit diagram of a primary-controlled switched mode power supply including a control circuit according to the present invention.

Referring now to the drawings and in particular to FIG. 1, a control circuit for controlling the output voltage Uout of a primary-controlled switched mode power supply is shown in its application environment. The control circuit 100 comprises a secondary-side switch S2 and an RC element R1, C1. In the auxiliary winding WH of the transformer shown in FIG. 1, voltage pulses are induced by primary-side sampling processes, the series-connected RC element modifying the voltage pulses still further by imposing a predefined time constant. The RC element is connected to the control input of the secondary-side switch S2 and provides a control signal with the imposed predefined time constant.

The secondary-side switch S2 is connected to a voltage tapping point P, which is provided between the secondary winding WS and the secondary auxiliary winding WH, and short-circuits temporarily the diode, which conducts the output voltage Uout outwards, the output voltage Uout being adapted to be tapped at a smoothing capacitor C2.

The secondary-side switch S2 receives via the RC element R1, C1 the positive and negative pulses of the control voltage with the imposed predefined time constant. The positive and negative control pulses are adjusted by the predefined time constant in such a way that the switch S2 will separate the connection between the output terminal and the voltage tapping point P shortly before the respective zero passage of said control pulses.

The temporary short-circuiting of the diode has the effect that the power loss is markedly reduced during the current flow.

When the time constant of the RC element is matched with the current flow period in the diode by a suitable selection of the resistance and capacitance values, the switch S2 will be blocked shortly before the polarity reversal of the voltage at the winding WS, whereby reverse currents through the switch will be prevented; these reverse currents would otherwise cause a high power loss.

Figure 2:
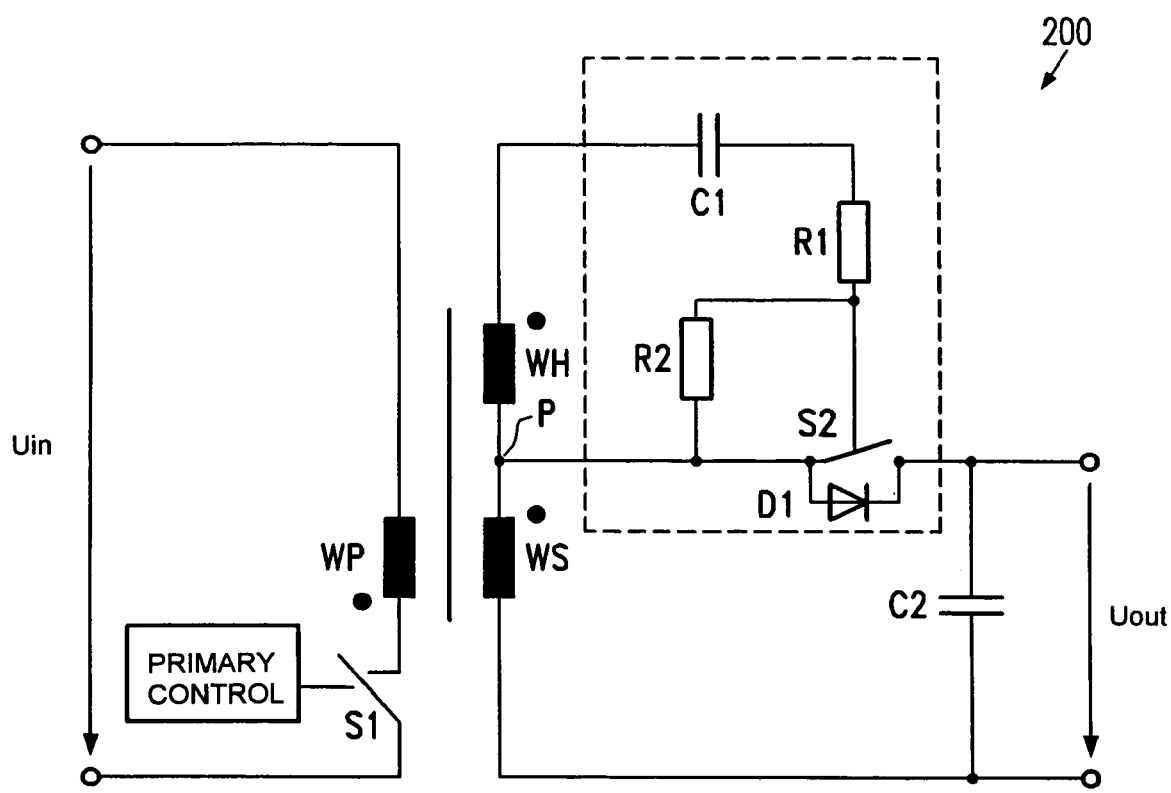
FIG. 2 shows a schematic circuit diagram of a primary-controlled switched mode power supply including a control circuit according to a further embodiment.

FIG. 2 shows another embodiment of the control circuit according to the present invention, said control circuit including a resistor R2 for defining a switching voltage of the secondary-side switch S2. The resistor R2 is connected to the voltage tapping point P and to a control input of the secondary-side switch S2.

Figure 3:
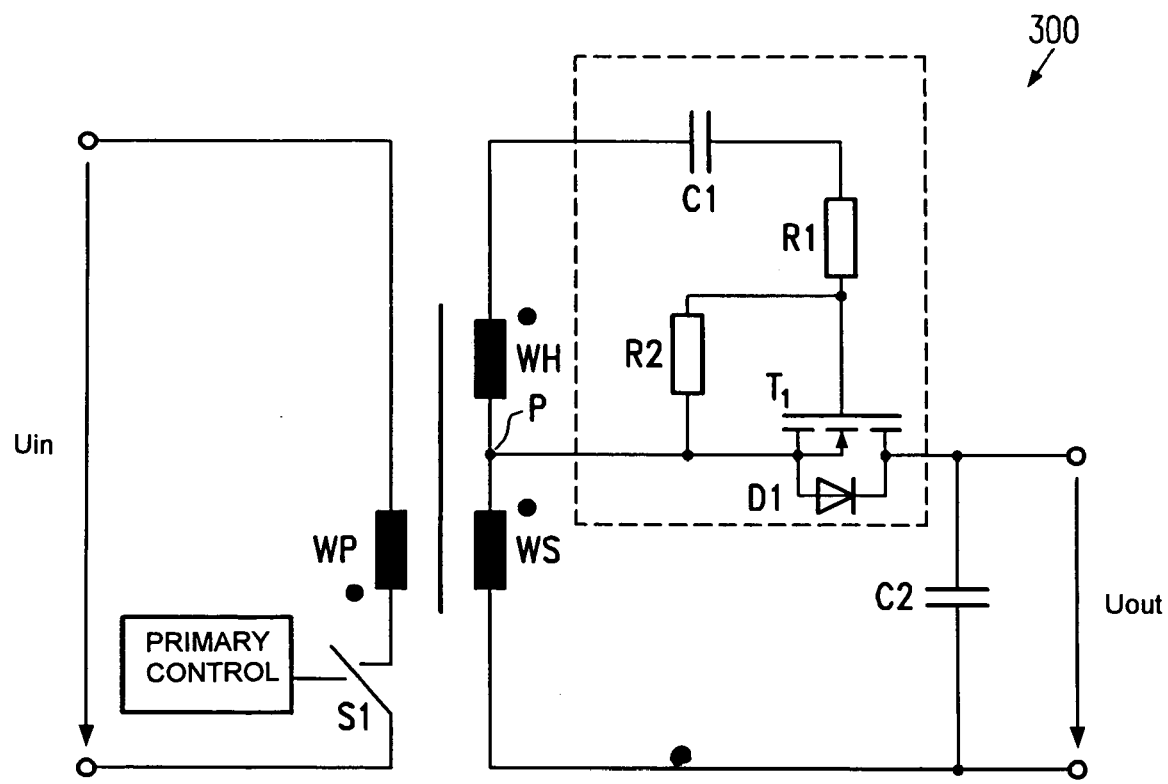
FIG. 3 shows a schematic circuit diagram of a primary-controlled switched mode power supply including a control circuit according to a third embodiment.

FIG. 3 shows an advantageous further development of the present invention in the case of which a field effect transistor T1 is used instead of the switch S2. The secondary-side field effect transistor T1 has supplied thereto a control voltage via the RC element R1, C1 in the manner described hereinbefore, said control voltage controlling the secondary-side field effect transistor T1 in an analog fashion in such a way that said field effect transistor T1 will be switched on during the largest possible part of the current flow period in the diode, but blocked early enough before the polarity reversal of the voltage at the winding WS.

In addition, the use of a field effect transistor as a secondary-side switch offers, in an advantageous manner, the possibility of using a commercially available and inexpensive component, which allows the control circuit to be produced at a reasonable price.

Due to the extremely small number of components required, the production costs for the control circuit can be reduced in an advantageous manner.

Reference should be made to the fact that the reasonably priced control circuit is particularly suitable for flyback converters, especially for switched mode power supplies of the type shown e.g. in German patent application DE 100 18 229 A1. The control circuit may, however, also be used in other primary-controlled switched mode power supplies.

Making use of the above-described embodiments of the present invention, it is possible to provide an improved switched mode power supply for generating an output voltage Uout. By means of the primary-side switch S1, primary-side sampling of an input voltage Uin is effected; a desired output voltage Uout can then be generated by selecting a suitable sampling frequency. The RC element generates positive and negative control pulses, said control pulses corresponding to a predefined time constant. The predefined time constant may e.g. correspond to a sampling frequency of the primary-side switch S1, the positive and negative control pulses causing the secondary-side switch S2 to establish a connection between the voltage tapping point and the output terminal of the switched mode power supply in such a way that the power loss of the rectifier elements (diode and synchronous rectifier) will be minimized.

By means of this and by means of all the other embodiments of the present invention described hereinbefore, a control circuit for a synchronous rectifier switch can be realized at an extremely reasonable price. In particular, no further components, such as PNP transistors or the like, are necessary.

Moreover, the method according to the present invention has the advantage, that switching off is improved, as it is performed time-dependently shortly before the current flow is ended. Thus, power losses by switching off can be reduced significantly.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

In addition, those areas in which it is believed that those ordinary skilled in the art are familiar have not been described herein in order to not unnecessarily obscure the invention described herein. Accordingly, it is to be understood that the invention is not to be limited by the specific illustrated embodiments, but only by the scope of the appended claims.

What is claimed is:

1. A control circuit for controlling an output voltage of a switched mode power supply, wherein said switched mode power supply comprises a primary-side switch and a transformer with a primary winding, a secondary winding and a secondary-side auxiliary winding, wherein a voltage tapping point is provided between the secondary winding and the auxiliary winding, wherein the control circuit is adapted to be connected to a connection of the auxiliary winding and to said voltage tapping point, wherein the control circuit is adapted to be connected to an output terminal of the switched mode power supply and the output voltage is adapted to be tapped parallel to the secondary winding, and wherein said control circuit comprises:
   a secondary-side switch for short-circuiting a rectifier diode between said output terminal and said voltage tapping point, and
   an RC element for providing positive and negative control pulses having a predefined time constant, said RC element being connected in parallel to the auxiliary winding.

2. A control circuit according to claim 1, comprising a resistor for defining a switching voltage of the secondary-side switch, wherein said resistor is connected to the voltage tapping point and a control input of said secondary-side switch.

3. A control circuit according to claim 2, wherein the resistor has a resistance value which is adapted to a predefined discharge of the capacitance of the RC element.

4. A control circuit according to claim 1, wherein the secondary-side switch is a field effect transistor which includes an integrated rectifier diode.

5. A control circuit according to claim 1, wherein the RC element is implemented such that the time constant corresponds to a period for which current flows through the rectifier diode.

6. A switched mode power supply for generating a controlled output voltage, said switched mode power supply comprising:
   a primary-side switch for sampling an input voltage,
   a transformer having a primary winding, a secondary winding, and a secondary auxiliary winding adapted to produce an auxiliary voltage, and
   a control circuit for minimizing the power loss, said control circuit comprising:
   a secondary-side switch for short-circuiting a rectifier diode between said output terminal and said voltage tapping point, and
   an RC element for providing positive and negative control pulses having a predefined time constant, said RC element being connected in parallel to the auxiliary winding.

7. A switched mode power supply according to claim 6, comprising a resistor for defining a switching voltage of the secondary-side switch, wherein said resistor is connected to the voltage tapping point and a control input of said secondary-side switch.

8. A switched mode power supply according to claim 7, wherein the resistor has a resistance value which is adapted to a predefined discharge of the capacitance of the RC element.

9. A switched mode power supply according to claim 6, wherein the secondary-side switch is a field effect transistor which includes an integrated rectifier diode.

10. A switched mode power supply according to claim 6, wherein the RC element is implemented such that the time constant corresponds to a period for which current flows through the rectifier diode.

11. A method for controlling the output voltage of a switched mode power supply comprising a primary-side switch, a primary winding, a secondary winding, a secondary auxiliary winding adapted to produce an auxiliary voltage, and
   a control circuit for controlling the output voltage, said secondary winding and said auxiliary winding having provided between them a voltage tapping point, and said method comprising the following steps:
   primary-side sampling of an input voltage by the primary-side switch,
   generating the output voltage of the switched mode power supply,
   generating positive and negative control pulses by an RC element, said control pulses corresponding to a predefined time constant,
   outputting said positive and negative control pulses to a secondary-side switch which includes a parallel diode,
   temporarily short-circuiting the parallel diode by the secondary-side switch dependent upon the positive and negative control pulses for minimizing the power loss of the switched mode power supply.

12. A method according to claim 11, wherein the predefined time constant corresponds to the period for which current flows through the parallel diode.

* * * * *